Oct. 29, 1946.  R. E. HINES  2,410,344
COLLET CHUCK
Filed Aug. 7, 1944  2 Sheets-Sheet 1
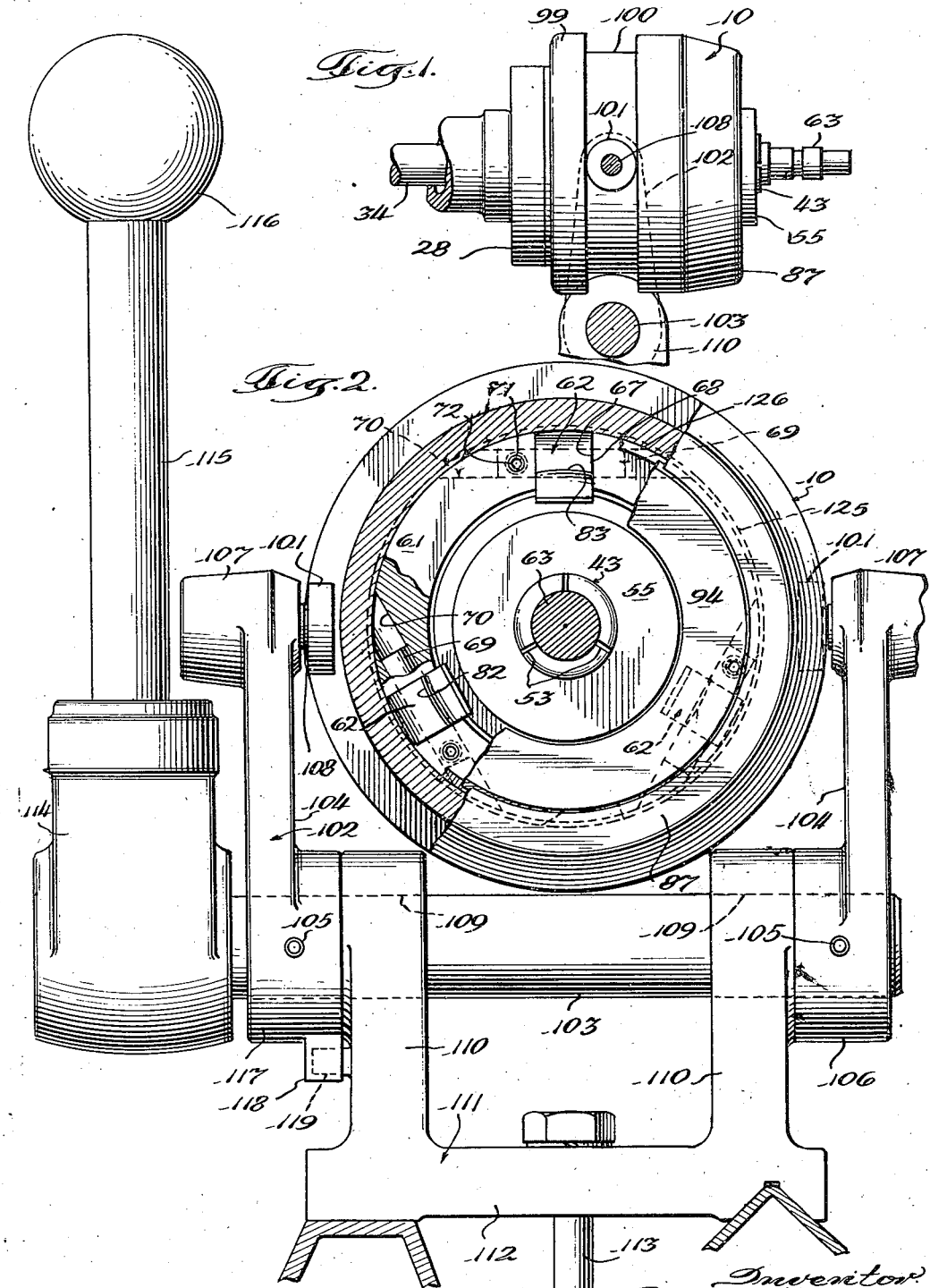

Oct. 29, 1946.    R. E. HINES    2,410,344
COLLET CHUCK
Filed Aug. 7, 1944    2 Sheets-Sheet 2
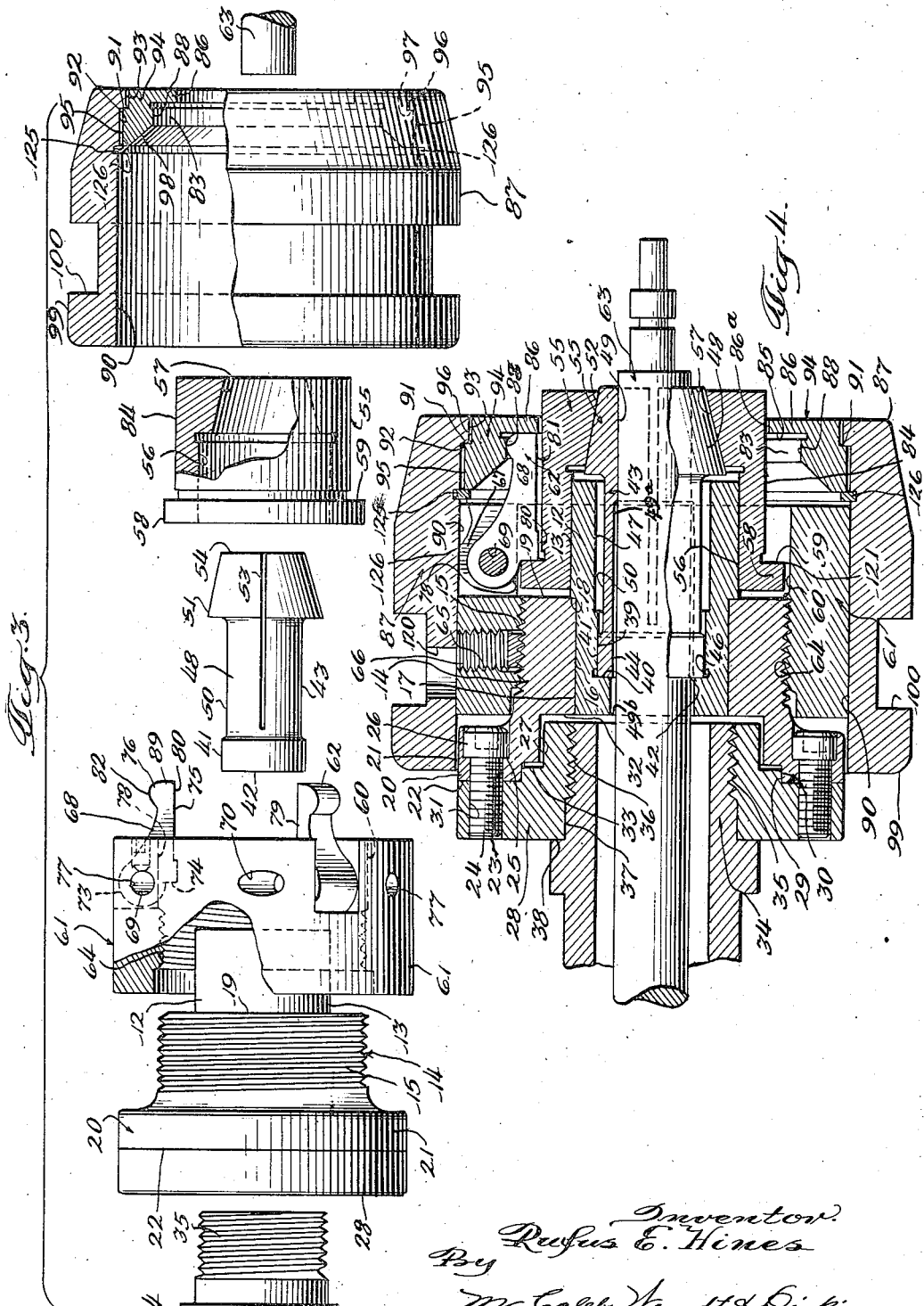

Patented Oct. 29, 1946

2,410,344

UNITED STATES PATENT OFFICE 2,410,344

COLLET CHUCK

Rufus E. Hines, Chicago, Ill.

Application August 7, 1944, Serial No. 548,325

2 Claims. (Cl. 279—50)

The present invention relates to collet chucks, and is particularly concerned with the provision of improved collet chucks for use with lathes or milling machines in production work. The present collet chuck is an improvement of the collet chuck shown in my prior application, Ser. No. 495,683, filed July 22, 1943, which has issued as U. S. Patent No. 2,364,212, on December 5, 1944.

The present invention relates to collet chucks, and is particularly concerned with the provision of an improved collet chuck which is adapted to secure or to release the work piece while the chuck of the lathe or milling machine is still rotating, so that it is not necessary to stop the machine when it is desired to remove one work piece from the chuck and to place another in the chuck.

It is well known that in production work the time consumed in stopping, decelerating, starting, and accelerating the machine is an important factor in the cost of the products made. In a machine operation requiring one or one and a half minutes, as much as one half minute may be consumed when the work is finished, in bringing the chuck to a stop so that the article may be removed from the chuck and another work piece inserted in the chuck, and in bringing the chuck up to working speed again. The time so wasted is proportionally larger in operations which require only a short period of machining than it is where the machining operations take a longer period of time.

One of the objects of the present invention is the provision of an improved collet chuck of the type disclosed in my said prior application, in which the structures of the actuating member and the cam which it supports are so arranged that the force which is applied to the closing member is equally distributed and applied in an axial direction at three equally spaced points so that there is no tendency of these forces to tilt or cock the closing member in any action diverging from the axial direction.

According to the present invention, this is accomplished by a separate camming member, which is mounted in a floating relation with respect to the actuating fingers and the actuating member so that this cam may find its own position in which all of the three fingers are equally tensioned and simultaneously actuated to bear the load equally when the collet is closed.

In order to secure such an equal bearing of the load in the collet shown in my prior application very accurate machine work is necessary, and each of the three fingers must be identical in size and shape and identically and symmetrically placed on the supporting body; and it is another object of the invention to provide an improved structure by means of which such extreme accuracy in the location and construction of the fingers and cam are not necessary, so that the chucks may be constructed with greater economy and equal accuracy in the final support of the work in production.

In addition to these objects, the objects of the present invention are substantially the same as those of my prior application, above mentioned.

Other objects and advantages of the invention will be apparent from the following description and the accompanying drawings, in which similar characters of reference indicate similar parts throughout the several views.

Referring to the two sheets of drawings accompanying this specification,

Fig. 1 is a side elevational view, in partial section, of a collet chuck embodying the invention, and mounted upon the spindle of a lathe;

Fig. 2 is a full size and elevational view of the chuck, with its actuating mechanism for securing and releasing the work piece, the actuating mechanism being mounted on the bed of the lathe;

Fig. 3 is an exploded view in side elevation and partial section, showing the parts of the chuck in the order of their assembly;

Fig. 4 is a full size vertical sectional view of the chuck, taken on a plane passing through the axis of the spindle of the lathe.

Referring to the drawings, 10 indicates in its entirety my improved collet chuck, which is shown in connection with the spindle nose of a lathe. The collet chuck 10 is provided with a metal body 12, having an accurately machined, round, and polished outer cylindrical surface 13.

The metal body 12 is preferably carried by a supporting collar 14, which may be provided with a cylindrical bore 16, adapted to receive with a tightly pressed frictional fit the reduced cylindrical portion 17 of the body 12.

This reduced cylindrical portion 17 is separated from the cylindrical surface 13, by an annular shoulder 18; and in some embodiments of the invention the body 12 and the supporting member 14 may be one integral member.

The reduced cylindrical portion 17 is pressed into the bore 16 until the annular shoulder 18 engages the plane end 19 of supporting member 14.

The supporting member 14 is provided with the outer threaded surface 15 and with a radially extending attaching flange 20 having an outer cylindrical surface 21 and a plane annular face 22. The attaching flange 20 preferably has a plurality of regularly spaced bolt apertures for receiving the bolts 24, and the flange has an equal number of counterbores 25 for receiving the heads 26 of the bolts 24.

The supporting member 14 also has a counterbore 27 for receiving the reduced cylindrical end portion of a threaded collar 28, and a second counterbore 29 may be provided in the attaching flange 20 for receiving the cylindrical portion 30 on the collar 28. The cylindrical surfaces 29 and 30 on the supporting member 14 and threaded collar 28 serve to assure the concentricity of the chuck body with the threaded collar 28. The bolts 24 pass through the flange 20 and are threaded into the bores 31 in the collar 28.

There is preferably a clearance between the annular surfaces at the points 32, 33 so that the plane surface 22 of the attaching flange 20 may engage the collar 28 without interference at the points 32, 33.

The collar 28 is adapted to engage the nose 34 of a lathe spindle which is provided with threads at 35 for engaging the complementary threads 36 in the collar 28, and the nose 34 and collar 28 are also provided with the closely fitting cylindrical surfaces at 37 and the engaging plane surfaces at 38 to assure the firm and concentric support of the chuck body 12 on the nose of the lathe spindle.

The parts 12, 14, and 28 are actually fitted and secured together before the grinding of the surfaces 37, 13, and other concentric surfaces of the chuck, so as to assure concentricity of all of the surfaces of the chuck which should be so.

The chuck body 12 is provided with an accurately ground cylindrical bore 39 terminating in an abrupt annular shoulder 40, for engaging complementary cylindrical surface 41 and plane end surface 42, respectively, on the collet 43. Body 12 also has a through counterbore 44 for passing the work piece, and bore 44 may be larger than the bore 49 in the collet 43 so that a number of similar collets of different bore sizes 44 may be used in the same chuck.

The body 12 preferably has a clearance groove 46 adjacent the annular shoulder 40 and an enlarged counter bore 47 surrounding the expanding portions 48 of the collet 43 so as to provide room for expansion of the collet 43. The collet 43 comprises an accurately machined and polished metal member having an axial through bore 49, which has a close but sliding fit with a work piece of predetermined cylindrical shape and size.

Like the collet in my prior application, above mentioned, the collet 43 herein is intended to grip the work or stock only at the right end of the collet in Fig. 4, over a predetermined length of the bore 49, which is indicated by the distance between the right end of the collet and the shoulder 49a, indicating the beginning of a clearance. There is a clearance 49b extending from 49a to the seated end of the collet and a greater clearance in the body 12 at the bore 44. Such collets are provided in the proper size for round bars that are used in them, and the clearance is necessary because such bars may vary a few thousandths in production in their diameters.

It will be evident that if the bar is exactly the same size as the collet, its cylindrical surface would fit within the curvature of the cylindrical gripping surfaces of the bore 49 on the collet. The length of these gripping surfaces is sufficient to hold the work firmly in axially centered position, and a high degree of accuracy is attained by this chuck, as evidenced by measurement of the concentricity a short distance out from the place where the chuck grips the work.

If the work piece happens to be slightly bigger than the bore 49 in the collet, such as a few thousandths, then obviously the two cylindrical surfaces of the collet and the bar will not fit perfectly, but the collet will grip the work at each of its legs, the contact being at the edges of each slot 53 in the collet, effecting a grip of the work by means of six lines of contact. If the stock happens to be smaller in diameter than the bore 49 of the collet, such as a thousandth, then obviously the cylindrical surface of the bar will not fit the cylindrical bore 49 in the collet because the bar is smaller; but there will be a line of contact between the bar and the collet midway between the slots of the collet, effecting a grip by three lines of contact.

One of the most important advantages of the present chuck is that it can be used to grip a work piece, however short, and stock can be used up down to the very last end of the bar, since the gripping takes place along the bore 49 at the end of the collet where work is being done.

In addition to the parts already described, the collet 43 also has a reduced cylindrical surface at its middle portion 50, and it preferably has a larger head 51. The head 51 has a frusto-conical camming surface 52, and the end of the collet, which carries the head, that is, the receiving end of the collet, has a plurality of equally spaced, axial slots 53, which extend not only through the head 51, but backwardly into the body of the collet through the middle portion 50 of the collet, stopping short of the cylindrical portion 41 of the collet.

These slots 53 separate the receiving end of the collet 43 into three work gripping portions or jaws 54, and the length of the slots 53 is such that the jaws 54 have a high degree of flexibility. Thus it requires only a very small axial force to cause the jaws to grip the work.

The closing member of the chuck is indicated by the numeral 55, and it comprises a sleeve-like metal member having an accurately ground cylindrical bore 56 for engaging the cylindrical surface 13 on the body 12, with which the closing member telescopes. At its forward end, that is, the right end in Fig. 4, the closing member 55 has a radially and inwardly extending body, which is provided with a through bore 57, having a frusto-conical surface for engaging the complementary frusto-conical surface 52 at the head 51 of the collet of the chuck.

At its inner or opposite end the closing member 55 has a radially and outwardly extending annular flange 58, having an annular thrust surface 59. Flange 58 is small enough to be received in the bore 60 of the supporting cage 61 for the actuating fingers 62. The action of the closing member is that as it slides inward, that is, toward the left in Fig. 4, conical surface 57 cams the conical surface 52 on the collet 43, and causes the jaws 54 to contract and grip a work piece 63. The accurately frusto-conical surfaces 52, 57 (with respect to the axis of the chuck and spindle) align and support the receiving end of the collet 43 in proper axial position.

The cage member 61 comprises a substantially cylindrical metal member having an internally threaded portion 64 for engaging the threads 15 on the supporting member 14 of the body 12. By means of threads 15, 64 the cage member 61 may have its axial position adjusted as desired for the purpose of adjusting the gripping tension at jaws 54 and of the fingers 62, as will be further described.

Cage member 61 preferably has a threaded radial bore 65 for receiving the slotted set screw 66, which engages member 14 to clamp the cage in any desired rotative and axial position on the body 12, 14.

The cage member 61 is provided with a plurality, preferably three in number, equally spaced, axially extending slots in that end of the cage member which is toward the receiving end of the chuck, that is, the right end in Fig. 4. These slots have been indicated by numeral 67, and each slot 67 is adapted to receive one of the pivoted fingers 68 which are pivoted on the pins 69.

The pins 69 are mounted in the bores 70, which extend across the slots 67 and are located at right angles to the radius which extends from the axis of the chuck at the center of each slot. Each bore 70 also communicates with a threaded bore 71 for receiving a socketed set screw 72, which clamps the pivot pin 69 in place.

The fingers 68 are identical in construction, and each finger comprises an elongated member, preferably constructed to spring steel, provided with a bearing portion 73, a thrust shoulder 74, and an elongated resilient and relatively slender arm 75, having a cam head 76 at its end. The bearing portion 73 is an enlargement at the pivoted end of the finger, having a transverse through bore 77 of cylindrical shape for receiving the pivot pin 69 and serving as a bearing.

The thrust shoulder 74 is a radially extending surface or shoulder, located on the inner side of each finger, for engaging the thrust surface 59 on the closing member 55. The bearing portion 73 may have a substantially cylindrical edge surface extending from the thrust shoulder 74 and is of such size as to clear the inside of the unthreaded portion of the bore 78 in cage 61.

The arm portion 75 of each finger 68 is made slender and elongated to increase its resilient qualities, but it is also relatively stiff so that the collet will grip the work piece firmly but resiliently. The fingers may be provided with a plane surface 79 on each side, and with a plane surface 80 on that edge which is adjacent the closing member 55, which also clears the fingers at 81.

The cam portion 76 of each finger 68 may comprise a small enlargement at the free end of each finger, having that side which is opposite to the closing member 55 provided with a partially cylindrical surface 82. The size of this cam enlargement 76 is such that it may be received in the annular groove 83, which is defined by the outer cylindrical wall 84 of the closing member 55, the inner wall 85 of flange 86 on an actuating member 87, and the wall of the bore 88 in actuating member 87.

Each finger 68 is preferably provided with a plane end surface 89, which is adapted to serve as a stop surface, when it engages the inner surface 85 on flange 86 of the actuating member 87. All of the other parts of the chuck may be made of tool steel.

The actuating member 87 may comprise a substantially cylindrical metal member having a through bore 90 for slidably receiving the cage member 61. At the receiving end of the chuck, that is, the right end in Fig. 3, the actuating member 87 is provided with an annular shoulder 92 and a smaller cylindrical counter-bore 93.

The bore 90 and counter-bore 93 are adapted to receive the floating annular member 94, which serves as a camming and retaining member and engages the fingers 68. The floating member 94 has an external cylindrical surface 95, which is of slightly smaller diameter than the bore 90 and external cylindrical surface 96, which is of slightly smaller diameter than the bore 93, and it is provided with the annular shoulder 91 that has a sliding engagement with the annular shoulder 92.

The actuating member 87 is also provided with an annular groove 125 for receiving the split steel ring 126 that springs into the groove 125 and provides an annular shoulder for holding the floating member 94 against the annular shoulder 92.

The split ring 126 is preferably rectangular in cross section and complementary to the rectangular groove 125. The end member 94 also has the inner frusto-conical camming surface 98, leading to the inner wall surface 88, the latter being adapted to serve as a retaining surface for maintaining the pressure on the fingers 68.

The radially inwardly extending flange 86 on the end member 94 serves to close that portion of the chuck against dust or shavings, and serves to provide a stop surface to limit the axial movement of the actuating member toward the left in Fig. 4.

The radial flange 86 is provided with a centrally located cylindrical bore 86a, which also has a clearance with respect to the closing member 55 so that this flange does not interfere with the floating movement of the member 94.

The floating member 94 is adapted to move in its recess, sliding on the ring 126 and the annular surface 92 in such manner as is dictated by the force which is applied to the ring by the fingers 68 as the floating member 94 is moved backward against the ends of the fingers.

The floating member 94 will take such a position that each of the three fingers 68 has the same force applied to it, and the closing member 55 is actuated axially by an equal force applied to three equally spaced points on the thrust surface 59.

The length of the actuating member 87 is preferably such that it extends over the outer cylindrical surface 21 on the supporting collar 20 so that this end of the chuck structure is also closed against entrance of dust or shavings. The actuating member 87 is also preferably provided in its outer cylindrical surface 99 with a circumferentially extending groove 100, which may be of rectangular shape in cross section for receiving the rollers 101, carried by the fork 102.

The fork 102 may take the form of a shaft 103, provided at each end with an arm 104, each arm being pinned to the shaft 103, at 105. Each arm may be a cast metal member, having a hub portion 106 for receiving the shaft 103 and having a bearing portion 107, having a suitable ball or roller bearing (not shown) for supporting the roller shaft 108.

The fork shaft 103 is rotatably mounted in the bearings 109 provided in the upwardly extending arms 110 of a fixture 111, which may have its base plate 112, so formed as to fit upon the usual guides provided on the bed of a lathe, where the fixture may be secured by means of a through bolt 113.

Fork shaft 103 is also provided with a crank fixture 114, pinned to the shaft 103, and having a bore for the cylindrical rod 115, provided with a ball 116, and adapted to serve as an actuating lever for opening or closing the chuck.

The hub 117 of the left fork arm 104 may be provided with a stop member 118 for engaging another stop member 119 carried by the adjacent upwardly extending arm 110 of the lathe fixture 111. These stops limit the clockwise rotation of the lever 115, and prevent the lever 115 from moving so far that the actuating member 87 might come off the chuck. They also limit the range of movement of the lever 115 to a relatively small arc so that very little movement of this lever by the operator is required to open or close the chuck.

Reference has been made to the threads 15, 64 to adjust the axial position of the cage member 61, the adjustment being secured against further movement by set screw 66. The actuating member is provided with an aperture 120 (Fig. 4) to permit access to the set screw 66, without removing the actuating member 87.

The threads referred to permit a very fine adjustment of the position of the cage member 61 and hence of the fingers 68; and the fingers 68 should preferably be so adjusted that they engage the thrust surface 59 on the closing member 55, adjacent the outer corner of radially extending flange 58, that is, as close to pin 69 as possible. This increases the leverage of the fingers 68 on the closing member 55 because it utilizes the shortest radius possible on the bell crank which is represented by the thrust surface 74 on fingers 68 and the arm 75 of the finger 68.

The operation of the chuck is as follows: All of the concentric surfaces on the parts of the chuck are preferably ground so far as possible with the parts assembled, so that the collet of the chuck will hold the work piece 63 in accurately aligned axially located position. The chuck is shown in closed position in Fig. 4. In this position the fingers have entered the groove 83 in the actuating member 87, and the cam surfaces 82 are engaged by the cylindrical wall 88 of the actuating member 87.

In one form of the invention the surface 30 on the member 28 is left over-size so that the customer may place this member upon his lathe spindle and turn it concentrically to fit the bore 29.

In this position the fingers 68 exert only a radial force on the wall 88, and there is no force exerted by the fingers which would tend to open the chuck. Surface 88 is adapted to act as a keeper on the fingers to hold the chuck closed.

The cam 94, being mounted for floating movement, it automatically assumes a position in which equal camming force is applied to all three of the fingers 68 during the camming action. After the collet has been closed and the fingers pass into the bore 88, which acts as a retaining member, the floating member 94 is also adapted to exert an equal holding force on all three of the fingers 68.

Since it has three-point contact with the fingers, and since it is mounted for floating movement, the floating member 94 may assume such a position that is required by the reaction of the fingers 68 against it.

I have discovered that with such a floating cam the exact shape and size of the fingers and the exact location of their points of pivot assumes less importance with respect to the accuracy of the chuck because these factors no longer affect the way in which force is applied to the closing member 55.

With the present structure it is no longer so important that each finger shall be identically located and identical in shape and size; and therefore the present chuck can be constructed at a lower cost and with greater accuracy in the holding of the work, without such great care in maintaining the accuracy of size and location of the fingers and adjacent parts.

When the chuck is closed, as shown in Fig. 4, fingers 68, being resilient, are slightly bowed, and the thrust shoulder 74 on each finger engages the flange 58 on the closing member 55 to hold it in position as shown. Closing member 55 is in such position that its inner frusto-conical surface 57 holds the jaws 54 in engagement with the work piece and in axial position with respect to the axis of the chuck.

When it is desired to open the chuck, it is not necessary to stop the rotation of the chuck. The operator need only throw the lever 115 toward the right, that is, clockwise, through a small arc, and the fork arms 104, acting through the rollers 101, will move the actuating member 87 toward the right in Fig. 4.

As this movement takes place, the finger holding surface 88 of the actuating member 87 will pass off the fingers, and the fingers 68 will ride outward on the camming surface 98 of the actuating member 87.

As the fingers 68 pivot outward, away from the closing member 55, the thrust shoulders 74 will move axially toward the right in Fig. 4, permitting the closing member 55 to move toward the right also. The closing member 55 is urged toward the right in Fig. 4 by the resilient jaws 54 of the collet 43, which act on the camming surface 52 of the closing member 55. This movement is quite small, but it is found that release of the fingers immediately causes a release of the work piece in the collet.

Thus the operator need not lose the time incident to the stopping of the rotation of the chuck, but he need only throw the lever 115 in a clockwise direction to release the work piece while the chuck is rotating, and then the work piece may be removed and another inserted. Movement of the lever 115 in the opposite direction, that is, counterclockwise, causes the chuck to grip the work piece while the chuck is still rotating, and the operator may then commence work on the work piece at once.

The closing of the chuck on the work takes place as follows: Lever 115 moves the shaft 103 and fork 102 counterclockwise, and the rollers 101 move the actuating member 87 toward the left to the position of Fig. 4. As this movement takes place, camming surface 98 on the actuating member 87 rides on the cams 82 of each finger, causing all three fingers to pivot inward toward the closing member 55 at their free ends.

Due to the floating action of the member 94, equal force is applied to all three of the fingers 68 during this camming action.

This pivotal movement of the fingers continues until the fingers have their cam ends in the groove 83, where the fingers are retained until the actuating member is once more moved toward the right from the position of Fig. 4. As the fingers move pivotally inward, the thrust shoulders 74 on the fingers engage the annular thrust surface 59 on the flange 58 of the closing member 55, drawing the closing member toward the left to the position of Fig. 4.

The closing member exerts a contracting action on the free end of the collet, and causes the jaws 54 of the collet to grip the work piece, but this contracting action takes place wholly in a radial direction, as the collet cannot move inward, due to its engagement at its inner end with the abrupt shoulder 40 in the body 12 of the chuck. The chuck is thus adapted to grip the work without moving the work longitudinally.

As distinguished from the prior art devices, there is no advantage, in the present device, in keeping the collet or the closing member from rotating with respect to the rest of the parts of the chuck. The entire chuck is to be operated, at least most of the time, while rotating. Therefore, the collet and the closing member are left free to rotate in the assembly, and this causes the fingers 68 to come into engagement with new surfaces, and prevents all the wear from taking place on certain points of the closing member at the thrust surface 59.

It will thus be observed that I have invented an improved chuck which may be opened or closed without stopping the rotation of the chuck. This chuck is peculiarly adapted to be used for production work, where a large number of work pieces of the same size are to be placed in the chuck successively for work of any kind.

Much time may be saved by the use of this chuck in production work by reason of this inherent capability of my chuck. In addition, the chuck is capable of very accurate work, simple in construction and operation, and capable of use for a long period of time without necessity for repair or replacement of any of its parts.

While I have illustrated a preferred embodiment of my invention, many modifications may be made without departing from the spirit of the invention, and I do not wish to be limited to the precise details of the construction set forth, but desire to avail myself of all changes within the scope of the appended claims.

Having thus described my invention, what I claim as new and desire to secure by Letters Patent of the United States, is:

1. In an actuating mechanism for a collet chuck incorporating a collet provided with an axial bore, a locating surface at one end and a tapered peripheral surface at the other end, a supporting body having an axial bore for receiving the collet and including a shoulder for locating the collet axially thereof, a collet closing member slidably mounted for axial movement on said supporting member and having a tapered inner end surface coacting with said tapered peripheral surface of the collet to urge the locating surface of the collet against said shoulder of the supporting body and to effect closing action of the collet, and said collet closing member having a thrust surface opposed to the tapered inner end surface thereof, the combination comprising, a plurality of axially projecting fingers pivotally mounted in circumferentially spaced relationship on the supporting body and having shoulders engaging said thrust surface of the collet closing member, a chuck actuating member mounted for axial sliding movement on the supporting body, said chuck actuating member having an integral internal radial shoulder in opposed relationship to the collet locating shoulder of said supporting member, and a floating camming member of substantially less diameter than the chuck actuating member adjacent said shoulder carried by said chuck actuating member and having an internal camming surface in position for coaction with the ends of said projecting fingers during axial movement of the chuck actuating member to effect axial movement of the collet closing member, said camming member being axially located relative to the chuck actuating member by said radial shoulder and against which it is movable radially relative to the actuating member so that substantially equal force is applied radially to each of said fingers, whereby to balance the forces applied to said collet closing member.

2. The structure recited in claim 1, in which said chuck actuating member also has an internal annular groove spaced axially from said radial shoulder, and a resilient split ring disposed in said annular groove in the actuating member and projecting radially inwardly to overlap said camming member.

RUFUS E. HINES.